(No Model.) 3 Sheets—Sheet 1.
G. F. MOORE.
MACHINE FOR CUTTING HEEL STIFFENERS FOR BOOTS OR SHOES.
No. 304,844. Patented Sept. 9, 1884.
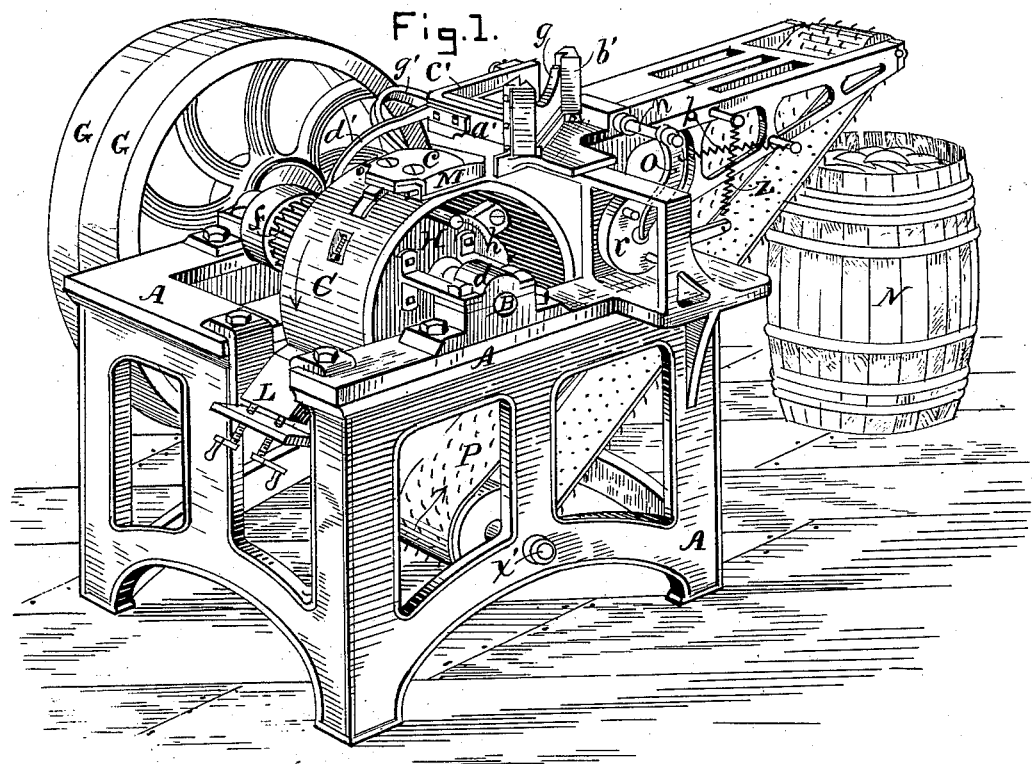
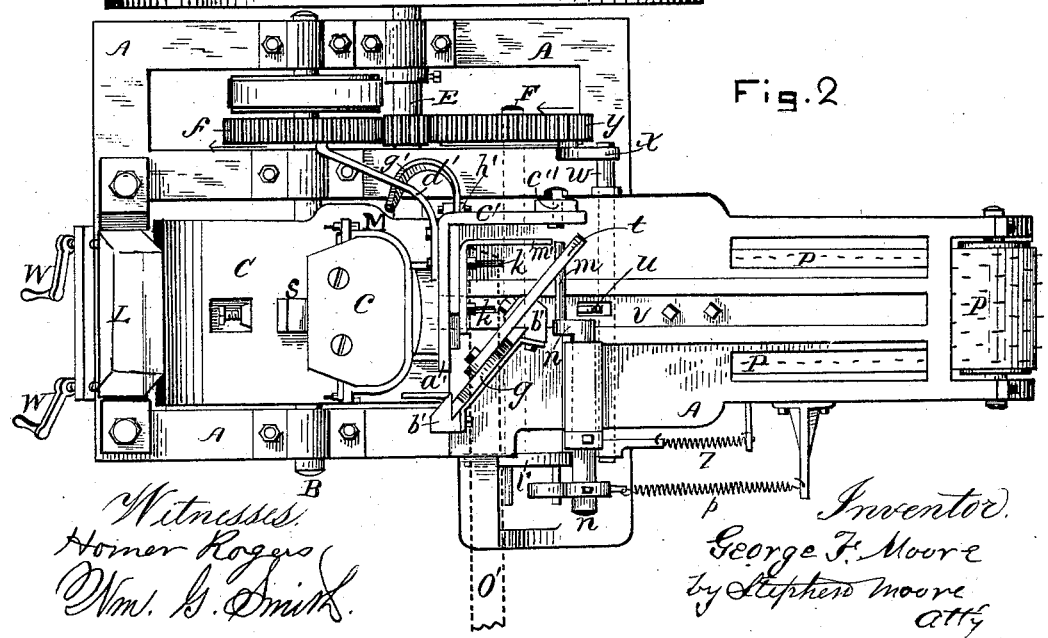
Witnesses
Homer Rogers
Wm. G. Smith
Inventor
George F. Moore
by Stephen Moore
Atty (No Model.) 3 Sheets—Sheet 2.
G. F. MOORE.
MACHINE FOR CUTTING HEEL STIFFENERS FOR BOOTS OR SHOES.
No. 304,844. Patented Sept. 9, 1884.

Witnesses
Homer Rogue
Wm. D. Smith

Inventor
George F. Moore
by Stephen Moore
Atty (No Model.) 3 Sheets—Sheet 3.

G. F. MOORE.

MACHINE FOR CUTTING HEEL STIFFENERS FOR BOOTS OR SHOES.

No. 304,844. Patented Sept. 9, 1884.

UNITED STATES PATENT OFFICE.

GEORGE F. MOORE, OF KENNEBUNK, MAINE.

MACHINE FOR CUTTING HEEL-STIFFENERS FOR BOOTS OR SHOES.

SPECIFICATION forming part of Letters Patent No. 304,844, dated September 9, 1884.

Application filed April 14, 1884. (No model.)

*To all whom it may concern:*

Be it known that I, GEORGE F. MOORE, of Kennebunk, in the county of York and State of Maine, have invented a new and useful Improvement in Machines for Cutting Heel-Stiffeners for Boots and Shoes, of which the following is a specification.

My invention relates to mechanism for carrying out that process of cutting heel stiffeners or counters from strips of material which is set forth in Letters Patent No. 140,569, dated July 8, 1873, and especially in the first claim of said patent, and as shown in Fig. 15 thereof.

In cutting stiffeners from strips of material such as leather-board it is desirable that the cut be made obliquely to the surface, so as to leave them with a beveled edge; and the object of my invention is to provide a machine that will rapidly and effectually do this.

My invention consists of mechanism for first cutting off a piece of the strip from which the stiffeners are to be made of a length sufficient to form the stiffener; then depositing such piece in a mold or cavity whose boundary corresponds with the boundary of the required stiffener; then depressing such piece within the mold, so that the mold may be carried under a knife, and that part of the said piece of material which projects above the boundary of the mold be cut away, leaving the finished stiffening in the mold, to be discharged by suitable means. The mechanical devices by which these various operations are automatically performed, and which, in their various combinations, constitute my invention, are set forth in the following description, in combination with the drawings, of which—

Figure 4:
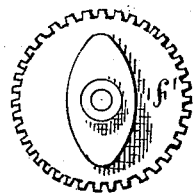
Figure 5:
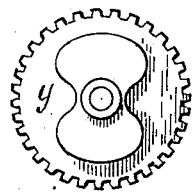
Figure 3:
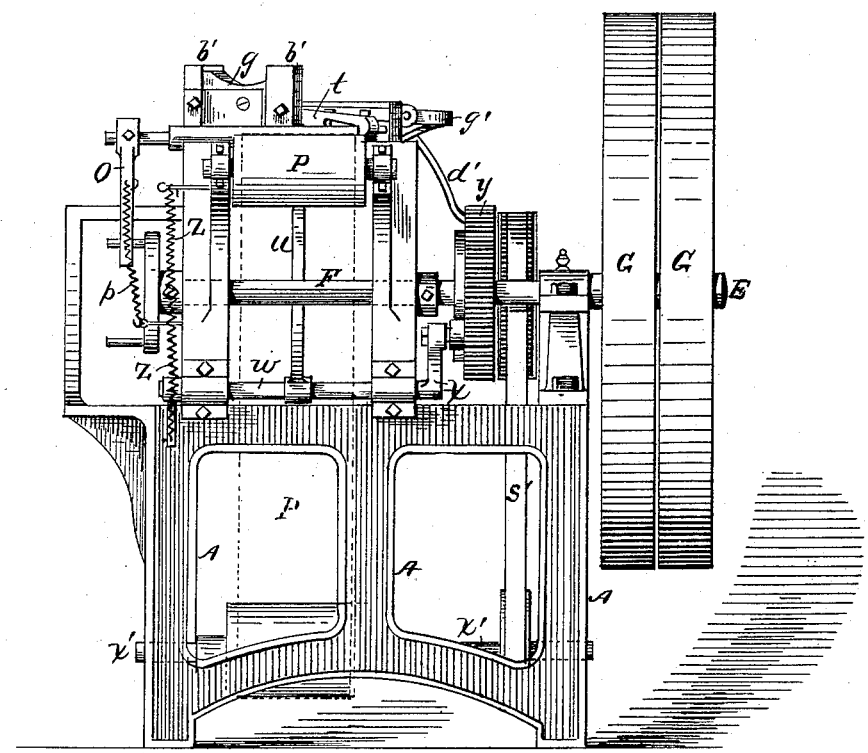
Figure 6:
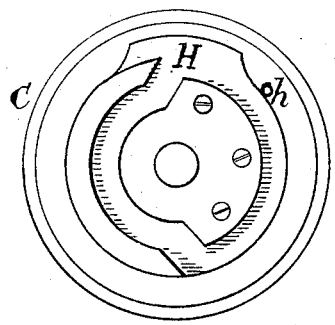
Figure 7:
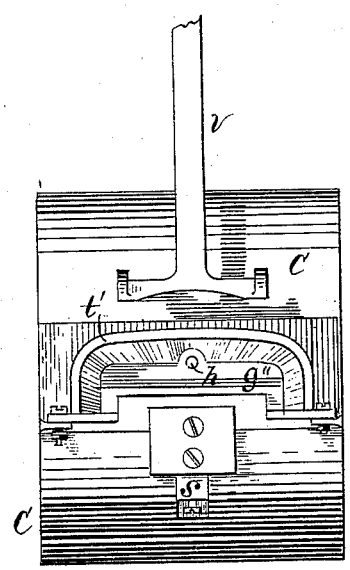
Figure 8:
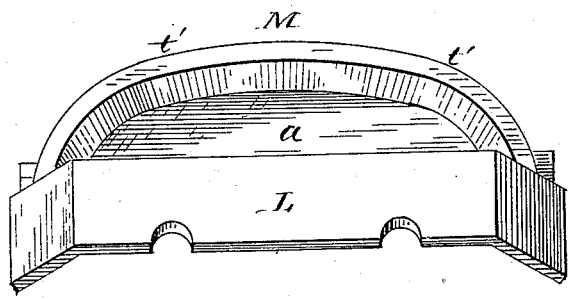

Figure 1 is a perspective; Fig. 2, a plan; Fig. 3, a rear elevation; Figs. 4 and 5, cam-wheels; Fig. 6, a stationary plate containing a cam-groove; Fig. 7, the mold attached to the drum, showing also the feeding-slide; Fig. 8, the mold and knife.

Similar letters of reference indicate like parts in each of the figures.

A A is a frame supporting the working parts of the machine. Upon this frame is mounted in suitable bearings a shaft, B, which carries the drum C, to be described hereinafter. This shaft B and also another shaft, F, near the rear of the machine, are driven at the same speed by gearing connecting them to a shaft, E, which carries the tight and loose pulleys G G, by which it is rotated.

Upon the periphery of the drum C, on opposite sides thereof, are mounted two molds, one of which is seen at M, and shown in detail in Figs. 7 and 8. This mold consists of a concave iron bed, $a$, (of the semi-elliptical shape of the stiffener to be cut,) and a steel rim, $t'$, inclosing the curved side thereof. In connection with this mold is a depression, $c$, (shown in Figs. 1 and 2, but removed in Fig. 7,) which is a thin plate of metal somewhat smaller than the mold $a$, and is attached to a bar, $s$, Fig. 7, which passes through the shell of the drum C, and is elevated and depressed as the drum revolves by a stud on its inner end, carrying a cam-roll which runs in a groove in the stationary plate H, which is held inside the drum by lugs bolted to one of the bearings $d$ of the shaft B. When a piece of material for a stiffener is laid across the mold, it is the office of this depressor to force it down into the mold, so all that is contained within the steel rim $t'$ shall be below the surface of such rim, and being held in this position as the drum revolves, it is carried under the knife L, which is set so as to barely clear the steel rim $t'$ of the mold, and thus all parts of the stiffener material outside the mold are cut away, leaving the stiffener with a beveled edge inside the mold. As the drum continues to revolve, the depressor is raised by the bar $s$ as it is forced outward by the stud and cam-roll on its inner end running in the cam-groove in the plate H, and a "discharger" lifts the stiffener from the bottom of the mold, and when the mold by the revolution of the drum has reached its lower side or begun to rise on its rear, the stiffener drops by gravity from the mold, or is readily discharged by striking a wire attached to the main frame of the machine. This discharger is shown in Fig. 7, and consists of a thin plate of metal, $g''$, lying in the bottom of the mold and fastened to the end of a rod, $h$, which passes through to the interior of the drum C, and, being bent at a right angle, projects horizontally beyond the edge of the plate H, and is held by a spring, (inside the drum,) so as to ride upon the edge of said plate, (see Fig. 1,) which is made of such a shape as will throw the discharger $g''$ outward at the proper time.

It has been found in practice that the knife L should be so shaped as to give an outward drawing cut along the edge of the stiffener. By shaping the knife with its ends beveled back, as shown, it operates perfectly, and is cheaply made of a thin plate of steel, as shown, and supported on a block of iron shaped to fit its interior. This forms one feature of my invention.

The strip of material from which the stiffener is to be cut is represented by the dotted lines at O', Fig. 2, and the knife $g$ sliding vertically in grooved ways $b'$ $b'$, as shown, is adapted to sever the requisite portion to form a stiffener. This knife is operated by a lever, $t$, to one end of which it is connected by a stud which passes loosely through a slot in one end of the lever, which is pivoted on a stud at $k$, Fig. 2, and is operated by a crank-pin, $m$, attached to a crank on one end of the rocker-shaft $n$. This shaft $n$ has an arm, Fig. 1, attached to its opposite end, which is pulled backward by a spring, $p$, and is moved forward by pins projecting from the face of the plate $r$, which is attached to the end of the shaft F, before mentioned. It will be seen that as the shaft F is revolved the pins mentioned will alternately strike the arm $o$ and move it forward, and the spring $p$, pulling it backward as each pin leaves it, gives a reciprocating rotary movement to the shaft $n$. The crank-pin $m$ on its opposite end works in a slot in one end of the lever $t$, and thus operates the knife $g$. When the piece to form the stiffener has been cut off from the strip of material, it is thrust forward into the mold and under the depressor by the follower $v$. (See Figs. 2 7.) This follower is a flat sliding bar having its forward end made broad and thick, as seen in Fig. 7, so as to catch against the edge of the stiffener when thrust forward, and is reciprocated in a groove in the rear extension of the frame A.

In the plan, Fig. 2, will be seen a slot in the slide $v$, in which enters the end of a vibratory arm, $u$, which is attached to a rocker-shaft, $w$, Fig. 3, which has an intermittent reciprocating rotary movement imparted to it through the crank $x$, the pin of which is held against the edge of a cam, $y$, on the rear gear-wheel. (See Fig. 2.) This cam is shaped as shown in Fig. 5, and the crank-pin is held to its edge by a spring, $z$, attached to a rearward projecting arm on the opposite end of the shaft $w$. The shape of this cam is such that the arm $u$ holds the slide $v$ back from the stiffener-blank while the same is being cut off by the knife $g$, and when it has been so cut off and the mold M is in the position shown in Fig. 1 the slide is suddenly thrust forward, carrying the stiffener into the mold.

In order that the stiffener may not be displaced as it is cut off, and get out of position to be moved by the slide $v$, two additional devices have been found necessary. One of these is a guard-plate, $a'$, which is a thin plate of metal which stands on edge between the severed stiffener-blank and the mold M. This guard-plate is attached to a bar, $c'$, one end of which is bent backward at a right angle and pivoted to a stud, $c''$. A curved bar, $d'$, is bolted to the guard-plate $a'$, and extends forward so as to be in position to be lifted by a cam inside the gear-wheel $f$, shaped as seen in Fig. 4. This guard-plate rests by gravity in front of the severed stiffener-blank, and is raised at the moment the slide $v$ thrusts the blank forward by the end of the cam $f$ striking the arm $d'$, and after the backward movement of the slide drops to its former position. The other device to keep the stiffener-blank in place is a depressor, which consists of a curved bar, $g'$, pivoted at $h'$, which extends just inside the guard-plate $a'$, and has horizontal pins $k$ $k$ projecting over the stiffener-blank, which slightly depress it at the moment the follower moves forward to thrust it into the mold. This slight downward motion is given to it by a projecting portion of the rim of the drum C, which strikes the end of the curved arm $g'$, which is not only curved forward, but downward, from the fulcrum $h'$, so that a lateral movement of the end of the curved arm $g'$ depresses the portion lying along the stiffener. A projecting bar, $m'$, from the same bar, $g'$, serves as a gage to regulate the length of the stiffener-blank to be severed from the strip of material. An endless belt, P, carrying projecting pins, passes over a drum at the extreme rear of the machine, and another beneath the drum C. This belt is moved by the revolution of the shaft $x'$, on which the lower drum is mounted, the same being driven by a belt, $s'$, from a pulley on the shaft B. As the stiffenings drop from the molds M upon the belt P they are carried upward and to the rear and deposited in a receptacle, N.

In operating the machine, the operator thrusts the end of the strip of material O, Fig. 2, beneath the knife $g$ and slides it along until the end strikes the gage $m'$. The knife $g$ descends and severs a piece large enough to form the finished stiffener. As the knife descends the pins $k$ $k$ descend also and hold the severed blank in place. The guard-plate $a'$ is raised, the slide $v$ is thrust forward, carrying the blank into the mold M, beneath the depressor $c$, which is, as the drum revolves, brought down, forcing the blank into the cavity of the mold M, with the edges thereof projecting over and beyond the rim $t'$ of the mold. As the drum continues to revolve, the mold passes under the knife L, and the parts of the blank outside the rim $t'$ of the mold are severed, leaving a perfectly-shaped stiffener inside the mold. As the drum continues to revolve, the depressor $c$ is raised from the stiffener and the discharger $g''$ is raised from the bottom of the mold, carrying the stiffener with it. Thus lying loosely between the depressor $c$ and the discharger $g''$, it readily drops out as the mold is carried upward on the rear side of the drum, or pins projecting from the frame of the machine may be so placed as to be met by the stiffener as it rises, and thus insure its discharge. As the stiffeners fall from the mold they are caught by the belt P and carried upward to the rear and dropped into a receptacle, N.

I am aware of Letters Patent No. 159,606, dated February 9, 1875, and make no claim to anything therein set forth; but

I claim—

1. The revolving drum C, carrying one or more molds, M, each provided with a depressor, $c$, in combination with the knife L, substantially as set forth.

2. The combination of the mold M and depressor $c$ with a feed-plate, $v$, adapted to operate substantially as herein described.

3. The combination of the mold M, the feed-plate $v$, and the knife $g'$, arranged and to operate substantially as specified.

4. The combination, with the knife $g$ and feed-plate $v$, of the guard-plate $a'$, substantially as and for the purpose set forth.

5. The combination, with the knife $g$ and the feed-plate $v$, of the depressor $g'$, with its pins $k\,k$, arranged and to operate substantially as described.

6. In combination with the mold M and depressor $c$, the discharger $g''$, substantially as specified.

GEORGE F. MOORE.

Witnesses:
HOMER ROGERS,
STEPHEN MOORE.